US012687255B2

(12) United States Patent
Falcucci

(10) Patent No.: US 12,687,255 B2
(45) Date of Patent: Jul. 21, 2026

(54) SUPPORTING AND STABILIZING DEVICE

(71) Applicant: SMARTSYSTEM S.R.L., Fano (IT)

(72) Inventor: Andrea Falcucci, Fano (IT)

( * ) Notice: Subject to any disclaimer, the term of this patent is extended or adjusted under 35 U.S.C. 154(b) by 435 days.

(21) Appl. No.: 18/264,089

(22) PCT Filed: Feb. 7, 2022

(86) PCT No.: PCT/EP2022/052821
§ 371 (c)(1),
(2) Date: Aug. 3, 2023

(87) PCT Pub. No.: WO2022/171554
PCT Pub. Date: Aug. 18, 2022

(65) Prior Publication Data
US 2024/0133512 A1    Apr. 25, 2024
US 2024/0230023 A9    Jul. 11, 2024

(30) Foreign Application Priority Data

Feb. 12, 2021    (IT) ........................ 102021000003260

(51) Int. Cl.
*F16M 13/02*        (2006.01)
(52) U.S. Cl.
CPC ....... *F16M 13/02* (2013.01); *F16M 2200/041* (2013.01); *F16M 2200/063* (2013.01); *F16M 2200/066* (2013.01)
(58) Field of Classification Search
CPC ............. F16M 13/02; F16M 2200/041; F16M 2200/063; F16M 2200/066; F16M 13/04;
(Continued)

(56) References Cited

U.S. PATENT DOCUMENTS 3,653,802 A * 4/1972 Weiss ..................... B23P 19/06
29/283.5
5,360,196 A * 11/1994 DiGiulio ................ F16M 13/04
396/428
(Continued)

FOREIGN PATENT DOCUMENTS

IT    BO20080019 A1    7/2009

OTHER PUBLICATIONS

International Search Report for corresponding PCT/EP2022/052821 dated May 18, 2022.
(Continued)

*Primary Examiner* — Kimberly T Wood
(74) *Attorney, Agent, or Firm* — EGBERT, MCDANIEL & SWARTZ, PLLC

(57) ABSTRACT
A supporting and stabilizing device having a first attachment, a second attachment, a first and a second articulation mechanisms, respectively connected to the first and to the second attachment, and a stabilization mechanism disposed between the first and the second articulation mechanisms. The stabilization mechanisms having at least one arm provided with a longitudinal axis and having two ends that are rotatably connected to the articulation mechanisms, a fixed back piece integral with the arm and provided with a passageway, a sliding guide mechanism connected to the arm, a rod passing through the passageway and sliding in the sliding guide mechanism, and an elastic apparatus associated with the sliding guide mechanism and the rod. The sliding guide mechanism allows the rod to vary its orientation relative to the arm.

15 Claims, 8 Drawing Sheets

(58) Field of Classification Search
CPC ........... F16M 2200/044; F16M 11/048; F16M
11/2014; F16M 11/2092; F16M 11/24;
F16M 11/046
See application file for complete search history.

(56) References Cited

U.S. PATENT DOCUMENTS

2006/0258495 A1 *  11/2006  Hein ...................... F16M 11/24
474/82
2015/0053829 A1     2/2015  Lu

OTHER PUBLICATIONS

Written Opinion of the International Searching Authority for cor-
responding PCT/EP2022/052821 dated May 18, 2022.

* cited by examiner

SUPPORTING AND STABILIZING DEVICE

FIELD OF THE INVENTION

The present patent application for industrial invention relates to an improved supporting and stabilizing device.

BACKGROUND OF THE INVENTION

The field of reference is that of supports, and it refers in particular to a supporting and stabilizing device that is especially suitable for supporting a piece of equipment and for connecting said equipment to means, such as vehicles or people, in order to minimize the transmission of the movements and of the oscillations of said means to said equipment. Various types of supporting devices for cameras or other equipment are known, which are used in vehicles, in means of various type or for facilitating the stable support of such equipment by a human operator. In order to stabilize the equipment, said supports involve the use of oscillating arms and elastic means that provide contrasting forces or torques based on the applied load.

Such supports of the prior art are impaired by the fact that they do not ensure a perfect cushioning of the movements of the vehicle or of the carrier to which they are associated.

Another disadvantage of such known devices consists in the fact that they are difficult to adapt to loads of varying weights.

Additional disadvantages of said devices of the prior art consist in the fact that they have inhomogeneous behaviors depending on the intensity of the stresses to which they are subjected; they have a sometimes "rough" operation, that is to say with possible stops and/or not sufficiently smooth; they are complicated and/or not sufficiently reliable.

Another disadvantage of the supports according to the prior art is that, generally speaking, they are suitable for a single application and for stabilization along a single axis.

ITBO2008019A1, which has the same inventor as the present patent application, discloses a supporting and stabilizing device comprising a first attachment for a carrier, a second attachment for a load, a first articulation means connected to the first attachment, a second articulation means connected to the second attachment, and at least one stabilization means disposed between the first articulation means and the second articulation means. The stabilization means comprises:

at least one arm provided with a longitudinal axis and having two ends that are rotatably connected to the first and to the second means of articulation, a fixed back piece integral with the arm and having a passageway;

a sliding guide means of tubular shape connected to the arm;

a rod connected by means of a connecting rod to one of said articulation means; the rod passes through the passageway of the fixed back piece and is slidingly inserted in the sliding guide means; and an elastic means having a first end associated with the sliding guide means and a second end associated with the rod.

The sliding guide means of tubular shape does not allow the rod to oscillate, that is to say, it is configured in such a way as to keep the rod parallel to the longitudinal axis of the arm or better aligned with the longitudinal axis of the arm when the device is in use.

In such a configuration, however, the inventor has found out that the device has an unsatisfactory response to oscillations and/or external stresses. Otherwise said, the behavior of the device realized through the precepts of document ITBO2008019A1 deviates significantly from an ideal behavior that the same device should have.

US2015053829A1 discloses a load-supporting apparatus including a first attachment for a carrier, a second attachment for a load, a first articulation means connected to the first attachment, a second articulation means connected to the second attachment and a stabilization means disposed between the first articulation means and the second articulation means. The stabilization means comprises:

an arm rotatably connected to the first articulation means and to the second articulation means;

a fixed plate transversely fixed to the arm by means of screws;

a telescopic assembly having a tubular sliding means connected to the first attachment by means of a connecting rod and a rod slidingly inserted in the sliding means; the rod has a head that is constantly engaged against the fixed plate and an end that is opposite to the head and is disposed in the sliding means; and an elastic means that is shaped like a helical spring, having a first end engaged against a stop ring of the sliding means, and a second end engaged against the head of the rod.

Both the sliding guide means and the rod are arranged inside the helicoid of the spring. Therefore the spring tends to constantly move the rod away from the sliding guide means and constantly pushes the head of the rod against the fixed plate.

The device described in US2015053829A1 is impaired by some drawbacks.

Firstly, with the passing of time, the plate against which the head of the rod is constantly engaged is subject to wear and/or deformation and/or detachment from the arm, thus altering the operation of the device. Obviously, in order to restore the normal functioning of the device, frequent maintenance and/or repair interventions by specialized operators are necessary.

Moreover, a second inconvenience results from the fact that the end of the rod is disposed in the tubular sliding means and is not bound to any external element outside the sliding means.

As it is known, when a helical spring is compressed, in addition to being compressed, the helical spring may be slightly bent, especially when the two surfaces on which the spring acts are not perfectly parallel to each other. While bending, the spring acts on the rod transversely, making the rod rotate slightly in correspondence with the end, causing a slight misalignment between the rod and the tubular sliding means. Otherwise said, a hinge is substantially generated in correspondence of the end, around which the rod can rotate slightly due to the action of the bending spring. Such a slight misalignment may prevent the smooth sliding of the rod inside the sliding means, consequently altering the operation of the device.

BRIEF SUMMARY OF THE INVENTION

The purpose of the present invention is to devise a supporting device that is free of the drawbacks that impair the supporting and stabilizing devices of the prior art.

In particular, it is an object of the present invention to devise a supporting and stabilizing device that has a better response to external oscillations or stresses than the device described in ITBO2008019A1.

A further purpose is to devise a supporting and stabilizing device capable of cushioning the movements of the vehicle or of the carrier to which they are associated, ensuring a smooth homogeneous operation at all times, without getting stopped.

Another purpose is to disclose a device that can be easily adjusted in order to adapt to loads of different weights and that can maintain the same operation when the loads vary.

A further purpose is to disclose a device with a constant behavior, regardless of the intensity of the stress to which it is subjected.

Another purpose is to disclose a relatively simple device, which is very reliable even in adverse environmental conditions.

Another purpose is to disclose a very versatile device, suitable for human, animal and mechanical carriers, which can be used for cameras, vision or measurement systems, seats or lumbar supports, bunks and beds in general.

These purposes are achieved in accordance with the invention with the features listed in the appended independent claim 1.

Advantageous embodiments appear from the dependent claims.

The supporting and stabilizing device according to the invention is defined by claim 1.

BRIEF DESCRIPTION OF THE SEVERAL
VIEWS OF THE DRAWINGS

For the sake of explanatory clarity, the description of the supporting and stabilizing device according to the invention is continued with reference to the appended drawings, which only have an illustrative and non-limiting purpose, wherein.

Figures 1, 2, 3:
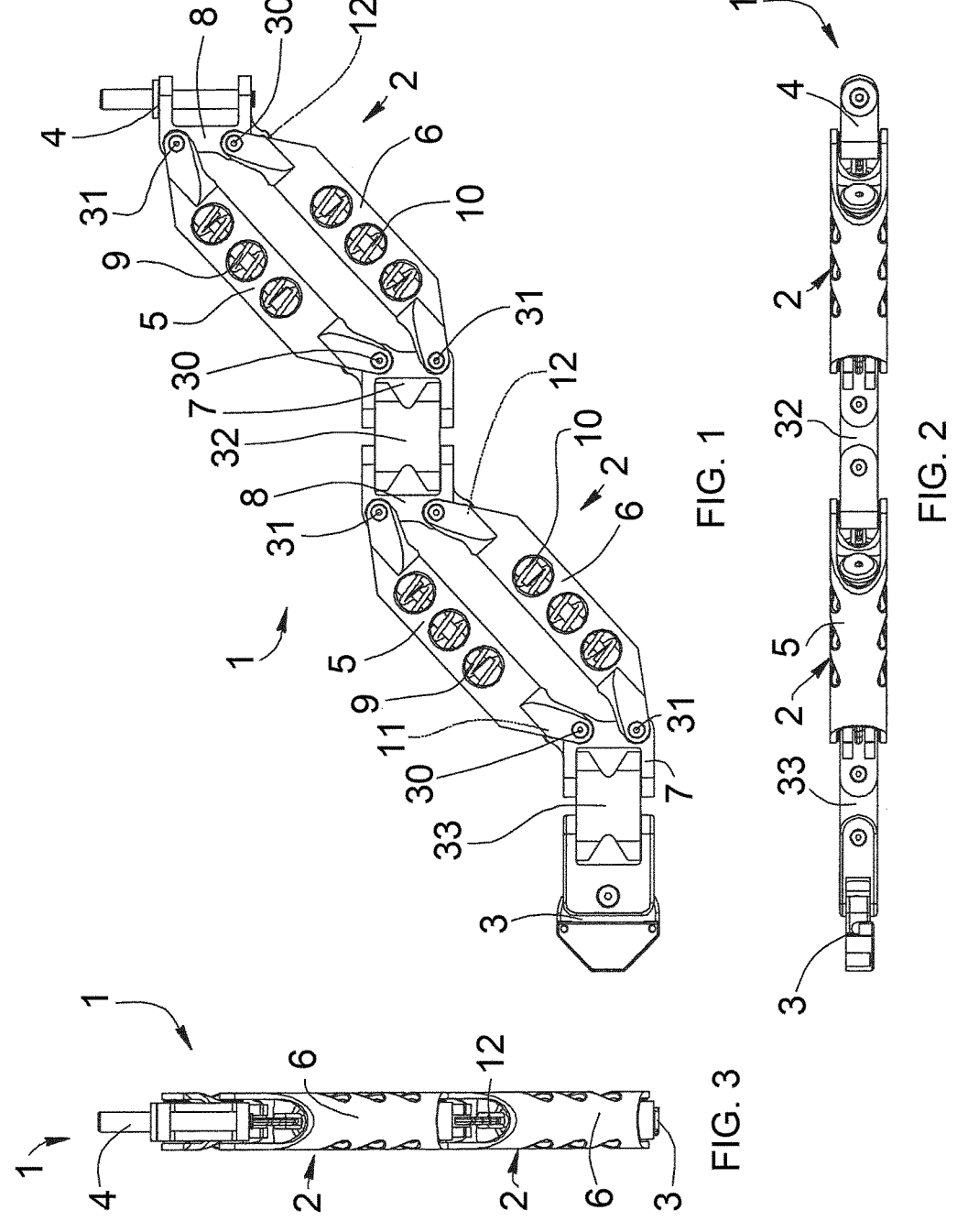
FIG. 1 is a side view of the supporting and stabilizing device of the present invention.
FIGS. 2 and 3 are a top view and a front view of the device of FIG. 1, respectively.

DETAILED DESCRIPTION OF THE
INVENTION

With reference to FIGS. 1 to 8, the supporting and stabilizing device, which is generally indicated with reference numeral (1), is described.

The supporting and stabilizing device (1) can be attached to a means or to a carrier, such as to a body harness of a human operator or to a vehicle, in order to support a load, such as a video camera means, a viewer or a tool, cushioning the predominantly vertical stresses that the carrier generates, undergoes and transmits during motion. In particular, the embodiment of the invention described below is suitable for cushioning predominantly vertical shocks and stresses and it may be arranged in an operating condition as shown in FIG. 1.

Referring to FIGS. 1, 2 and 3, the supporting and stabilizing device (1) comprises a first attachment (3) for the carrier, a second attachment (4) for the load, a first articulation means (7) connected to the first attachment (3), and a second articulation means (8) connected to the second attachment (4).

The device (1) further comprises at least one stabilization means (2) interposed between the first attachment (3) and the second attachment (4).

In the embodiment shown in the attached figures, the device (1) comprises two stabilization means (2), namely a stabilization means (2) in proximal position with respect to the carrier, and a stabilization means in distal position with respect to the carrier.

The two stabilization means (2) are connected to each other by means of a first joint means (32) which is connected to an end of the stabilization means (2) in distal position on one side, and to an end of the stabilization means (2) in proximal position on the other side.

In the operating condition, the two stabilization means (2) may oscillate on coincident or different vertical planes.

The two lateral portions of the first joint means (32) respectively comprise a second articulation means (8) for the stabilization means (2) in proximal position and a first articulation means (7) for the stabilization means (2) in distal position.

The first attachment (3) for the carrier constitutes a lateral portion of second joint means (33) whose further lateral portion consists in first articulation means (7) of the proximal end of the stabilization means (2) in proximal position. The central portion of the second joint means (33) is connected to the lateral portions (3, 7) by means of two vertical axes of rotation.

The second attachment (4) for the load is made in one piece with or is fixed to the second articulation means (8) of the distal end of the stabilization means (2) in distal position.

Figure 4:
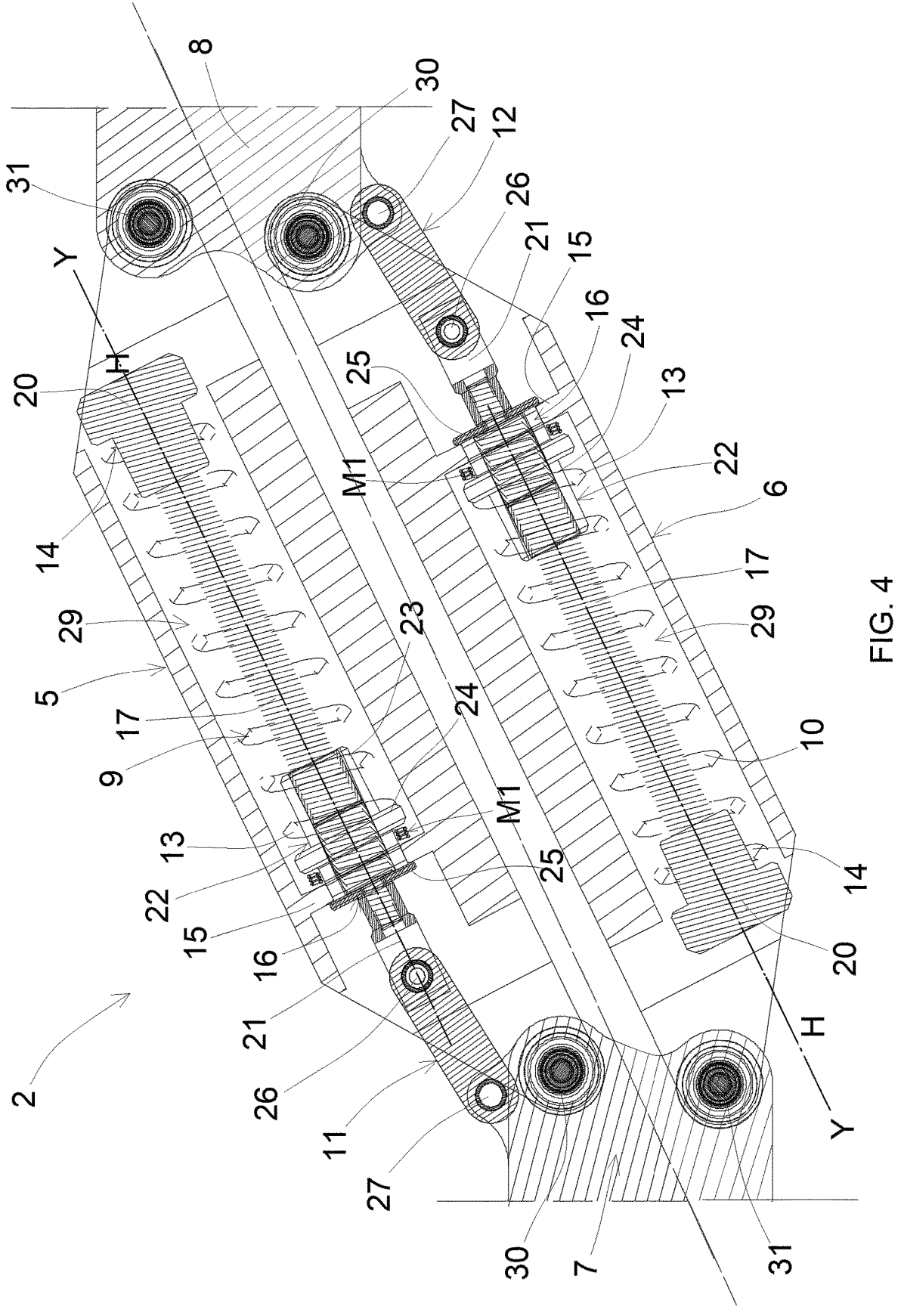
FIGS. 4, 4A and 4B are an enlarged view sectioned along a median plane of a portion of the device of FIG. 1; said FIGS. 4, 4A and 4B differ in the configuration of the sliding guide means for a rod.

Referring to FIG. 4, each stabilization means (2) comprises two arms (5, 6), each one of them being provided with a longitudinal axis (Y) and having two ends rotatably connected to the first articulation means (7) and to the second articulation means (8) by means of horizontal means with axis of rotation (30, 31).

Each arm (5, 6) is provided with a longitudinal cavity (29).

Each stabilization means (2) comprises a fixed back piece (15) for each arm (5, 6). The fixed back piece (15) is integral with the arm and has a passageway (16). The fixed back piece (15) consists of a perforated septum that is fixed transversely inside the longitudinal cavity (29) and delimits the longitudinal cavity (29) on one side. The hole of the perforated septum defines the passageway (16) of the fixed back piece (15).

Each stabilization means (2) comprises a sliding guide means (22) of tubular shape for each arm (5, 6), which is connected to the arm (5, 6).

Each stabilization means (2) comprises a rod (17) for each arm (5, 6) having an axis (H).

The rod (17) is connected to one of said articulation means (7, 8) by means of a connecting rod (11, 12). The rod (17) passes through the passageway (16) of the fixed back piece (15) and is slidingly inserted in the sliding guide means (22).

Each stabilization means (2) comprises an elastic means (9, 10) for each arm. The elastic means (9, 10) is disposed in the longitudinal cavity (29) of the arm (5, 6) and has a first end (13) associated with the sliding guide means (22) and a second end (14) associated with the rod (17).

The elastic means (9, 10) preferably consists of a cylindrical helical spring of metal type. Said rod (17) passes through the helicoid of the spring.

The rod (17) comprises an enlarged first end portion (20) that acts as back piece for the second end (14) of the respective elastic means (9, 10). The enlarged first end portion (20) is smaller in size than the longitudinal cavity (29).

Said first end portion (20) comprises a female screw engaged in a first threaded end of the rod (17), which can be rotated with a hand tool to modify its position along the rod (17) in order to adjust the preload of the respective elastic means (9, 10).

The rod (17) comprises a second end portion (21) articulated to one end of the respective connecting rod (11, 12), the remaining end of which is articulated to a protruding attachment fixed to, or formed in the corresponding first articulation means (7) or the corresponding second articulation means (8) to apply an elastic torque between the articulation means (7, 8) and the respective arm (5, 6).

The second end portion (21) of the rod (17) comprises a stop means (25) suitable for being engaged with the fixed back piece (15) in an idle condition of the stabilization means (2). Said stop means (25) has a female screw engaged in a thread of the second end portion (21) to adjust the idle condition.

Each rod (17) is rectilinear and the respective second end portion (21) is articulated to one end of the respective connecting rod (11, 12) by means of a first joint element (26), for example of spherical type or with horizontal pin perpendicular to the rod (17) itself. Each connecting rod (11, 12) is connected to the respective first articulation means (7) or second articulation means (8) by means of a second joint element (27), for example of spherical type or with pin parallel to the pin of the first joint element (26).

Said sliding guide means (22) is externally provided with a bushing portion (23) having a protruding annular edge (24) whereon the first end (13) of the elastic means (8, 9) abuts.

As mentioned above, the present invention was conceived with the intention of improving the behavior of the device described in ITBO2008019A1 devised by the same inventor of the present invention. As already mentioned, the inventor of ITBO2008019A1 had envisaged that the sliding guide means should be a rigid means capable of maintaining the axis of the rod always parallel to, or better aligned with the longitudinal axis of the arm.

Nevertheless, after performing numerous tests and studies, the inventor found out that the behavior of the device described in ITBO2008019A1 is not satisfactory.

In order to improve the behavior of said device, the applicant has contemplated modifying the sliding guide means (22) by configuring it in such a way that, in addition to sliding along the sliding guide means (22), the rod (17) can also vary the orientation of its axis (H) with respect to the longitudinal axis (Y) of the arm (5, 6).

Figure 9:
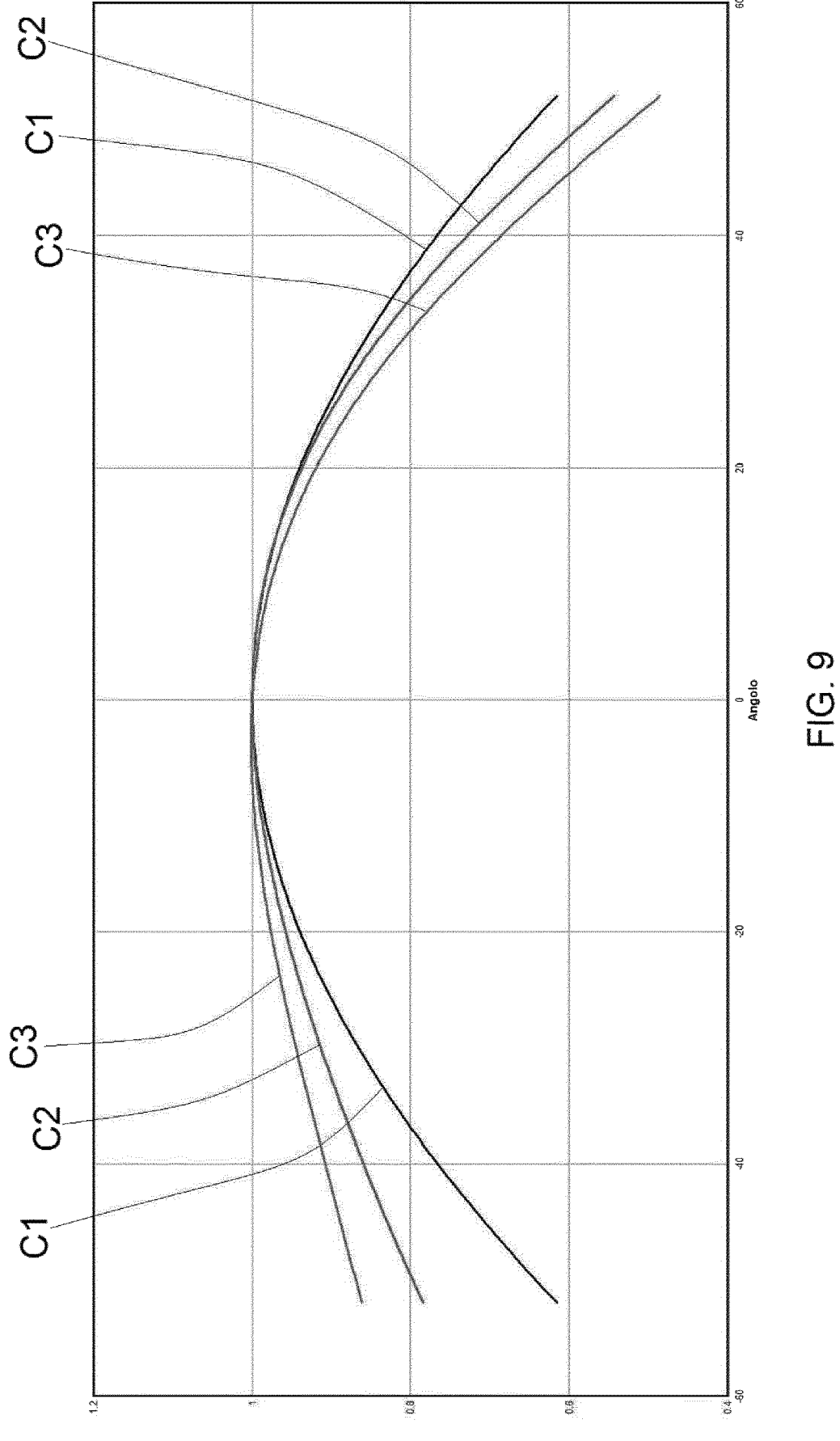
FIG. 9 is a graph illustrating the difference in behavior between a device wherein the axis of each rod is constantly aligned with the axis of the corresponding arm, and a device wherein the axis of each rod can vary with respect to the axis of the corresponding arm.

By allowing the rod (17) to vary its inclination with respect to the arm (5, 6) according to the forces acting on the device, the applicant has obtained a significant improvement in the behavior of the device itself. With reference to FIG. 9, the improved behavior of the new device (1) with respect to the old device can be visually appreciated.

In particular, FIG. 9 shows a graph comparing the behavior of a device provided with stabilization means with sliding guide means that maintain the rod aligned with the arm (device made according to the precepts of ITBO2008019A1), with the behavior of a device (1) provided with stabilization means (2) with sliding guide means (22) that allow the rod (17) to vary its inclination (device made according to the precepts of the present invention).

The abscissa of the graph indicates the orientation of the device with respect to the horizontal axis. Otherwise said, the value "0" indicates that the device (1) is disposed in a horizontal position.

On the other hand, the ordinate indicates the balancing moment generated by the device in correspondence of the attachment or joint in proximal position to the carrier. The balancing moment is normalized with respect to both the load and the distance of application of the load.

The graph of FIG. 9 shows three curves (C1, C2, C3), namely:

a first curve (C1) indicating the balancing moment generated by an ideal device; said first curve (C1) has the same trend as a cosine function;

a second curve (C2) indicating the balancing moment generated by a device (1) provided with stabilization means (2) having sliding guide means (22) that allow the rod (17) to vary its inclination, just like the new device proposed in the present invention;

a third curve (C3) indicating the balancing moment generated by a device provided with stabilization means (2) having sliding guide means (22) that maintain the rod (17) aligned with the arm (5, 6) as in the device described in ITBO2008019A1.

It is evident that the second curve (C2) is closer to the first curve (C1) than the third curve (C3); therefore, the device (1) with oscillating rods (17) is more efficient than the device with rods (17) aligned with the arms (5, 6).

Figure 4A:
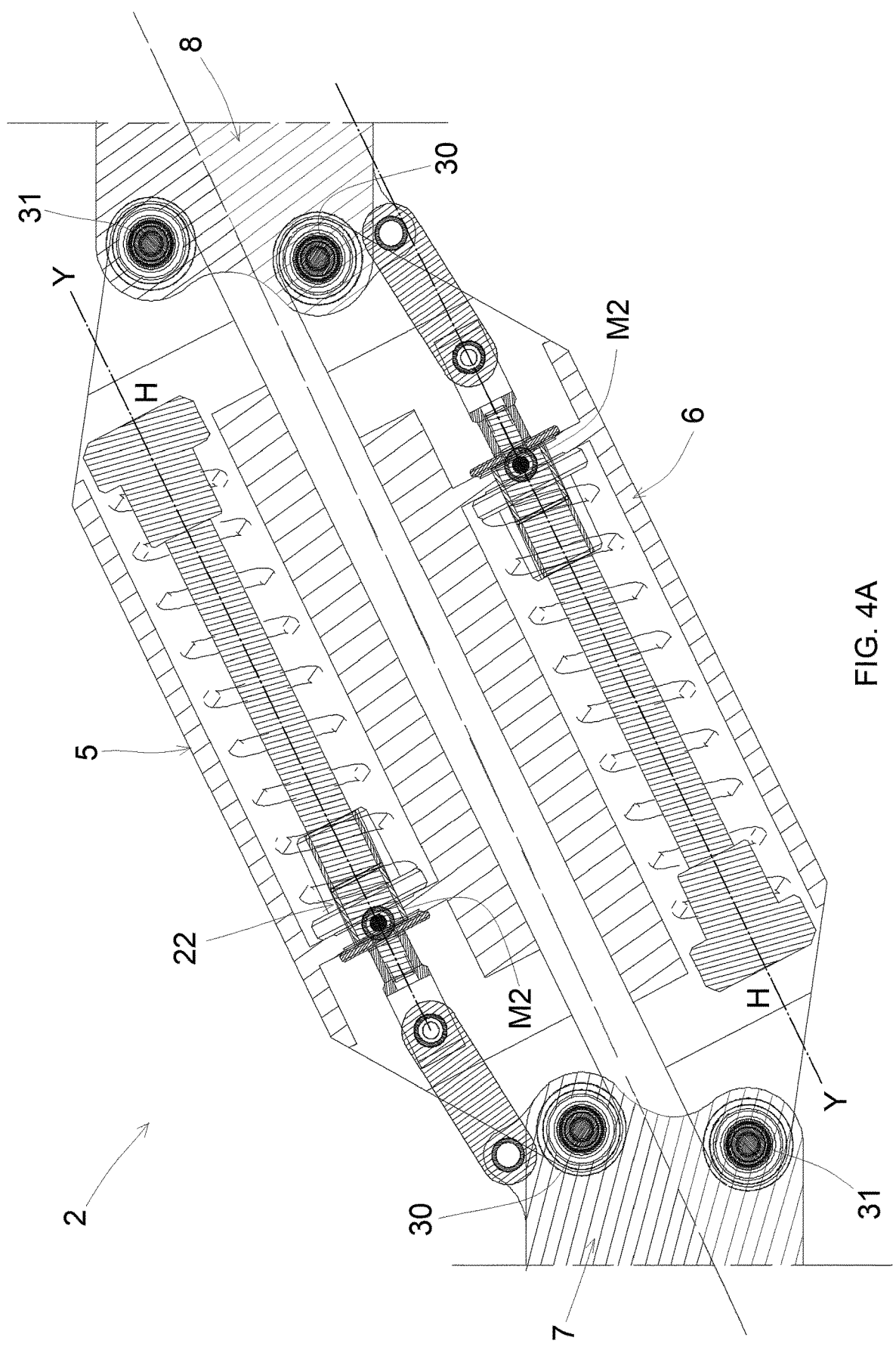
Figure 4B:
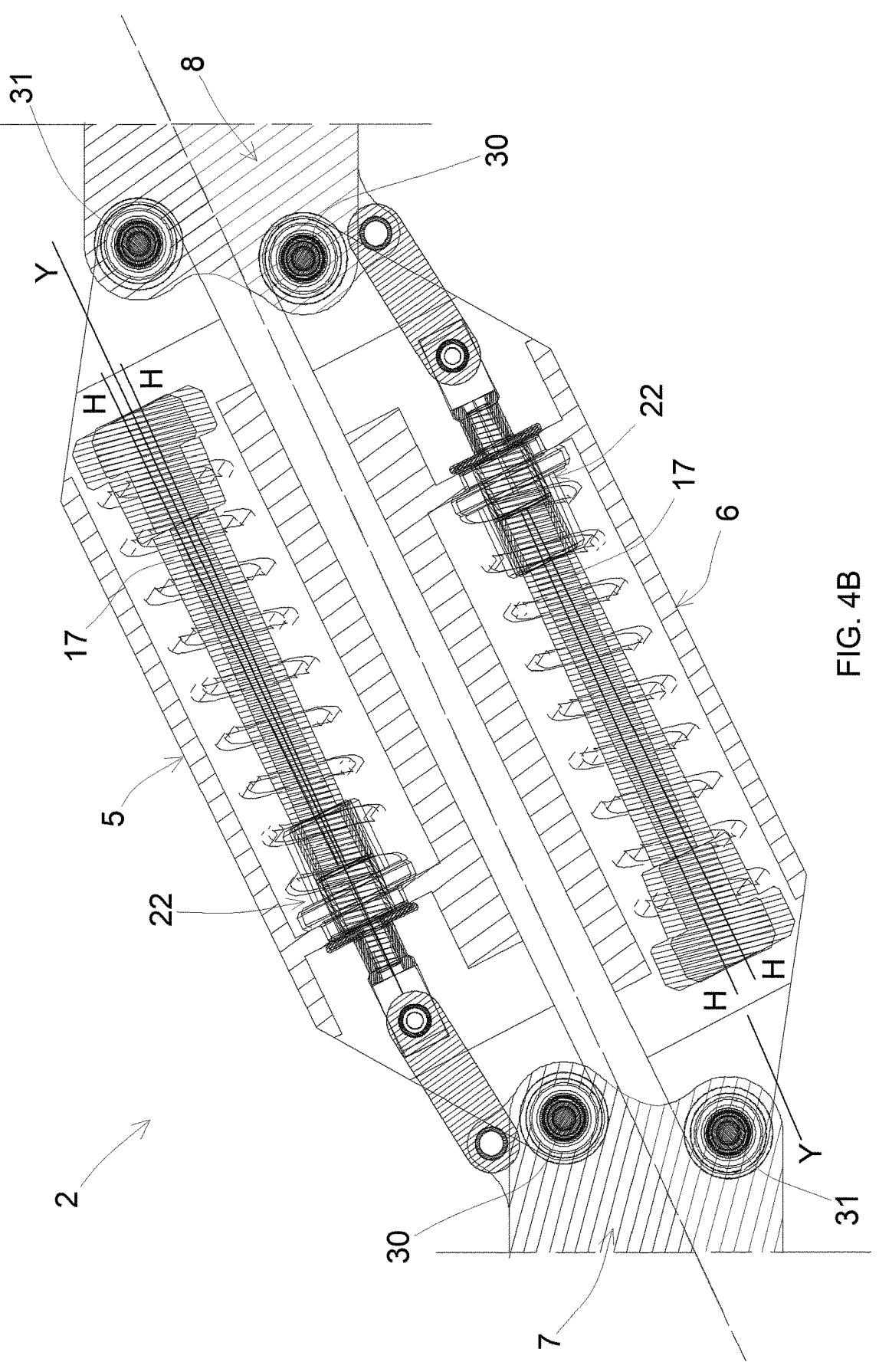
Figures 5, 6:
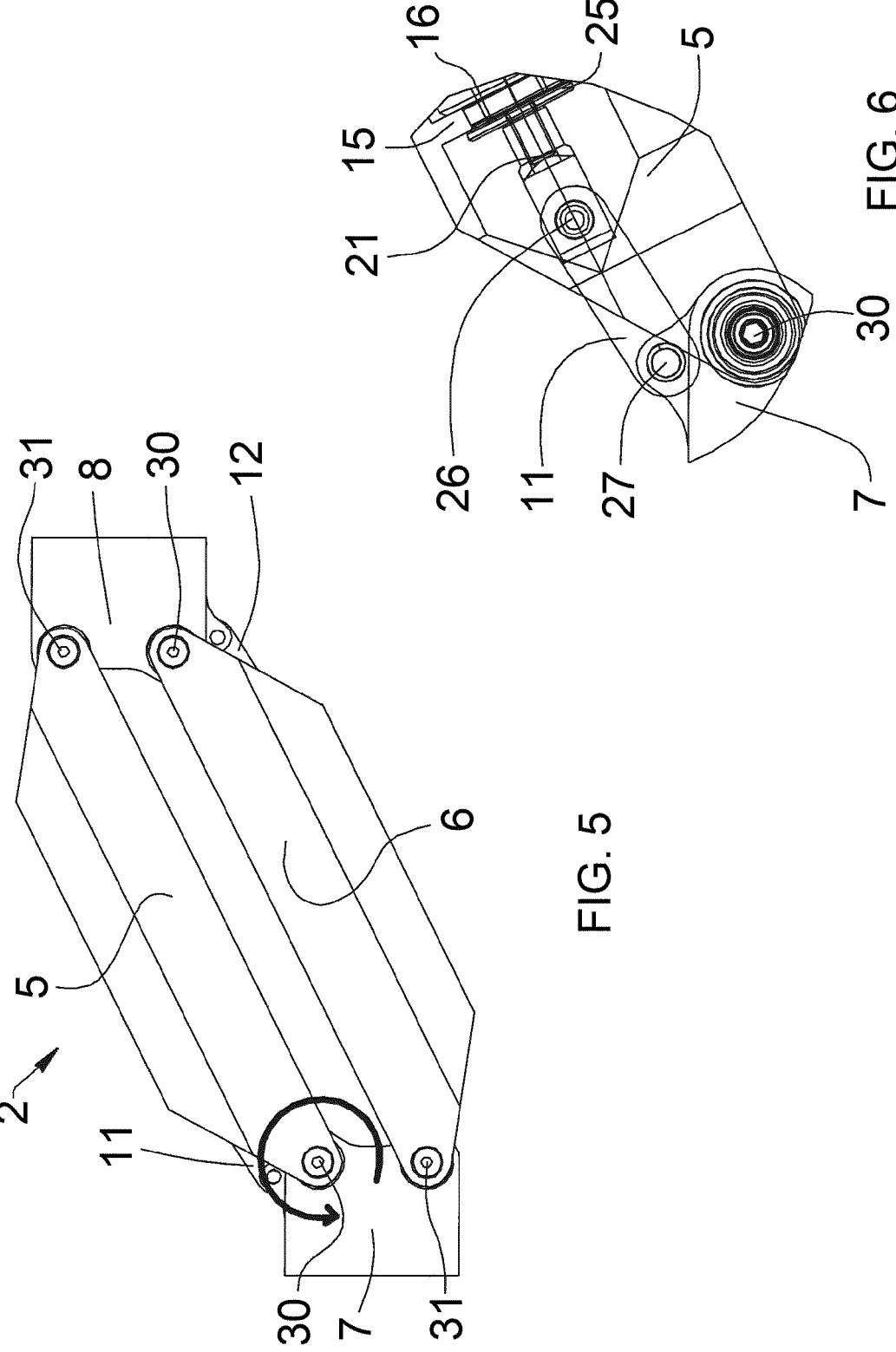
FIG. 5 is a schematic side view of a portion of the device in idle condition, wherein the load is disposed at a higher height compared to the carrier.
FIG. 6 is an enlarged, transparent schematic view of a detail of the portion of device shown in FIG. 5.
Figures 7, 8:
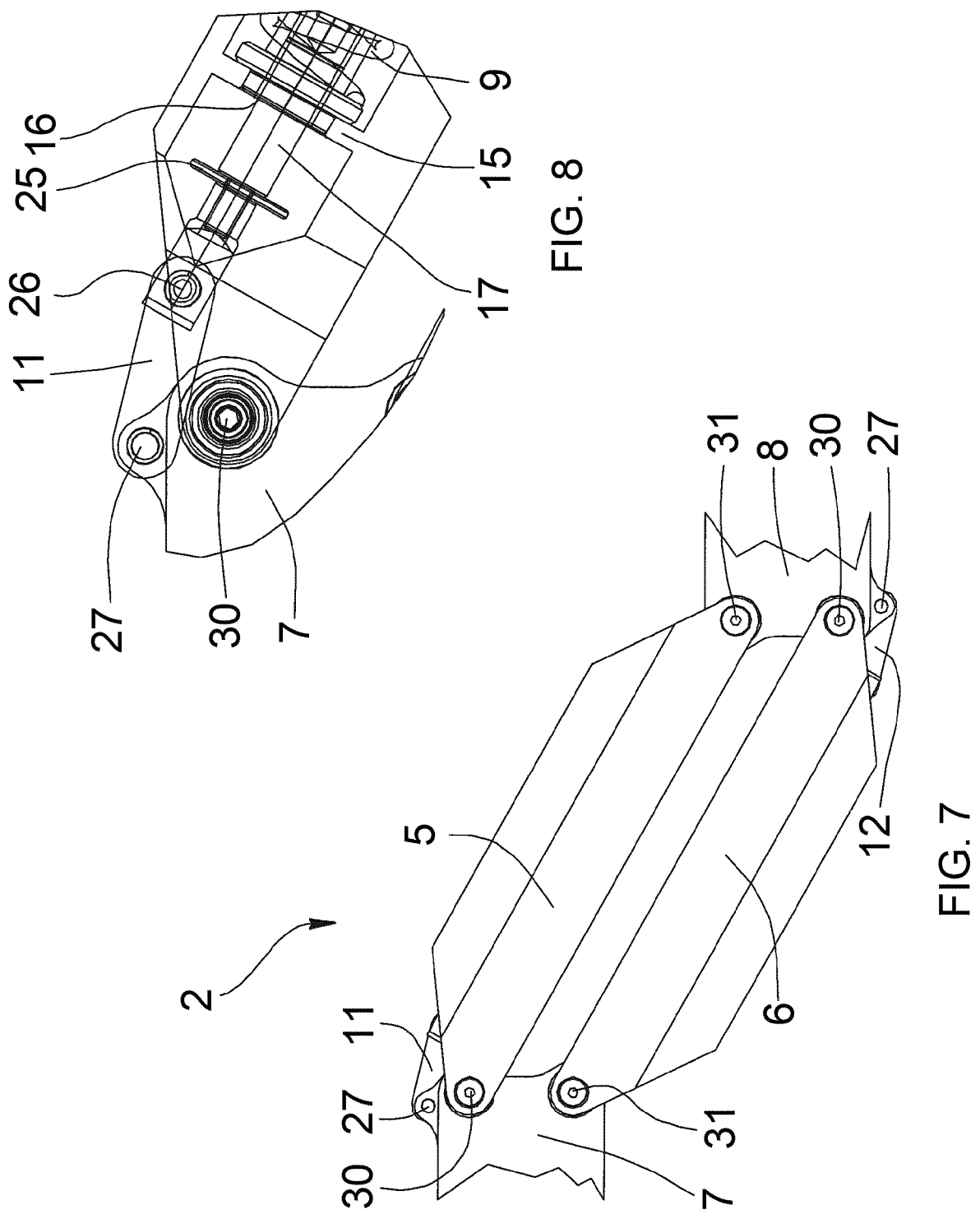
FIG. 7 is a schematic side view of a portion of the device in operating condition, wherein the load is disposed at a lower height compared to the carrier.
FIG. 8 is an enlarged, transparent schematic view of a detail of the portion of device shown in FIG. 7.

With reference to FIGS. 4, 4A and 4B, three different configurations of the sliding guide means (22) are shown, which determine the manner in which said sliding guide means (22) enables the rod (17) to vary the inclination of its axis (H) with respect to the axis (Y).

In FIGS. 4 and 4A, the sliding guide means comprises movable connecting means (M1, M2) for connection to the arm (5, 6) in a movable manner. More specifically, said movable connecting means (M1, M2) are configured in such a way as to allow the sliding guide means (22) to oscillate.

In particular, in FIG. 4, the movable connecting means (M1, M2) comprise elastically deformable means (M1) interposed between the sliding guide means (22) and the fixed back piece (15).

By way of example, said elastically deformable means (M1) may consist of torsion springs, cup springs, helical springs or the like.

With reference to FIG. 4A, the movable connecting means (M1, M2) comprise pivoting means (M2) that rotatably connect the sliding guide means (22) to the respective arm (5, 6) with the possibility of rotating about a transverse axis with respect to the longitudinal axis (Y) of the arm (5, 6).

By way of example, the pivoting means (M2) comprise two lateral pins aligned with each other that protrude outside of the sliding guide means (22) and are rotatably inserted into respective holes, or alternatively they may be defined by a contact of spherical or cylindrical type between two concave-convex surfaces formed between the sliding guide means (22) and the arm (5, 6).

With reference to FIG. 4B, the movement of the rod (17) is obtained by providing that the sliding guide means (22) is fixed to the fixed back piece (15) and is deformable, preferably elastically deformable.

Preferably, in the embodiment shown in FIG. 4B, the sliding guide means is made of technopolymer or may be made of a metallic material with a suitable thickness to ensure flexibility.

Each end of each arm (5, 6) is connected to the corresponding first articulation means (7) and to the corresponding second articulation means (8) by means of respective means with axis of rotation (30, 31) that are horizontal and parallel to the pins of the first joint element (26) and of the second joint element (27).

In the case of means with axis of rotation (30, 31) directed substantially in horizontal direction, such as in the embodiment shown in FIG. 1, for mostly vertical stresses, the second joint element (27) is positioned on the side of the means with axis of rotation (30) that determines an elastic torque suitable for contrasting the stresses caused by the weight of the load.

In the case of means with axis of rotation (30, 31) directed substantially in horizontal direction, the elastic torques of the two arms (5, 6) operate jointly to contrast the weight of the load and the two arms (5, 6), considered with their respective rods and connecting rods, are parallel and antisymmetrical.

The four means with axis of rotation (30, 31) of the two arms (5, 6) of each stabilization means (2) define the vertices of an articulated parallelogram whose four sides are formed of portions of the two arms (5, 6) and of the first articulation means (7) and of the second articulation means (8).

The operation of the device (1) provides that the first attachment (3) is fixed to a means or carrier, for example to the body harness of a human operator, and that the second attachment is connected to a load, for example to a camera whose weight, which is variable over a very wide range, causes a slight downward rotation of the stabilization means (2) in idle condition, until an optimal, practically horizontal arrangement of said stabilization means (2) is achieved. Such a rotation occurs as a result of compression and shortening of the elastic means (9, 10). While the operator is walking, the device cushions the vertical displacements while maintaining a constant orientation of the load. The configuration of the stabilization means (2), and in particular the transmission of the elastic force through the rods and the respective connecting rods, provides an operation that is largely independent of the weight of the load and is not sensitive to environmental conditions.

As an alternative to the aforementioned embodiment, the invention provides that the axes of rotation (30, 31) of one of the stabilization means may be inclined with respect to those of the other stabilization means in order to achieve a stabilization along two inclined axes. For example, one of the stabilization means may oscillate on vertical planes and the other one on horizontal planes. In the case of a stabilization means with means with axis of rotation (30, 31) oriented practically in vertical direction to oscillate on horizontal planes, the elastic torques of the two arms (5, 6) operate in opposition and the preload of the elastic means (9, 10) can be reduced to zero or nearly zero.

The invention further provides that the device may be provided with a single stabilization means with first articulation means (7) and second articulation means (8) connected directly to the second joint means (33), or to the first attachment (3), and to the second attachment (4).

The invention also provides that the device (1) may comprise a single arm, provided with its own elastic means, with the rod and the connecting rod connected to the first articulation means (7) connected directly to the second joint means (33), or to the first attachment (3). The end of the arm opposite the second joint means (33) is connected to the second attachment (4) directly or by means of a swiveling articulated head. In such a variant, the understanding of which does not require any specific figures, the function of maintaining the orientation of the load is not preserved.

Figure 10:
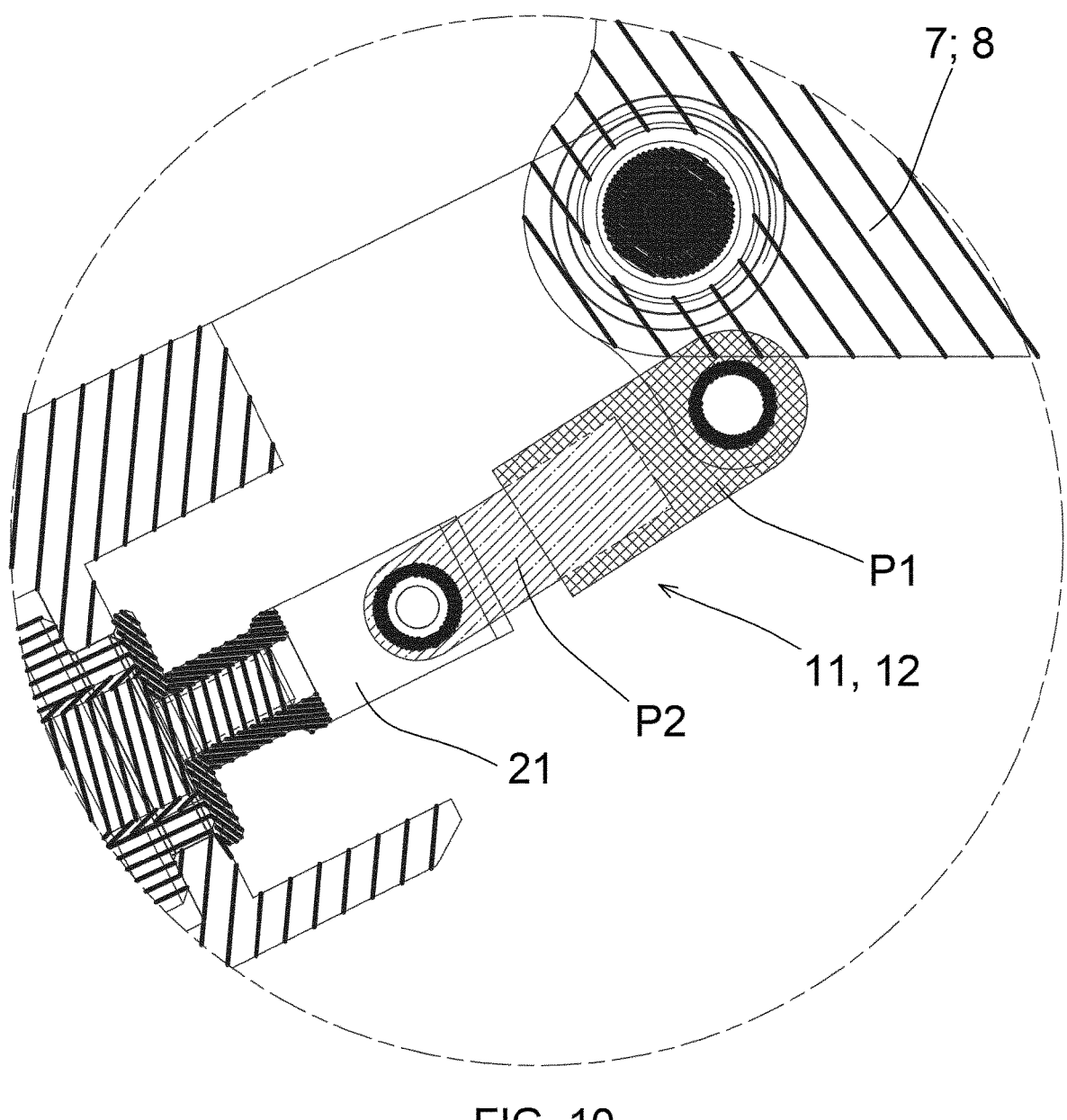
FIG. 10 is a schematic view of a technical detail of the supporting and stabilizing device according to the invention, which concerns a connecting rod of extendible type.

In an alternative embodiment of the invention, which is shown in FIG. 10, instead of being of one-piece type, the connecting rod (11, 12) may be of length-adjustable type, that is to say, the connecting rod may comprise a first portion (P1) and a second portion (P2), which can slide and can be locked in position in such a way to adjust the length of the connecting rod (11, 12), making the device versatile and adaptable to different uses.

The supporting and stabilizing device is able to cushion the movements transmitted by the vehicle, by the carrier and by the means in general to which it is associated, with a smooth homogeneous operation at all times, without being stopped.

The supporting and stabilizing device according to the invention can be easily adjusted in order to be adapted to loads of different weights and is able to maintain the same operation with varying loads.

The device according to the invention has a constant behavior, regardless of the intensity of the stress to which it is subjected.

The device according to the invention is relatively simple and very reliable even in adverse environmental conditions.

Moreover, the device according to the invention is very versatile and suitable for human, animal and mechanical carriers and can be used for cameras, cameras, vision or measurement systems, seats or lumbar supports, bunks and beds in general.

Moreover, the device may be stabilized on multiple axes.

Following is a summary of the advantages of the device according to the invention compared to the devices described in ITBO2008019A1 and US2015053829A1 cited in the prior art.

The behavior of the device according to the invention, compared to the device described in ITBO2008019A1, is much closer to the ideal behavior (see FIG. 9) that the device should have. So the new device is more efficient than the device described ITBO2008019A1 and represents a technical evolution of the device described in ITBO2008019A1.

Compared to the device described in US2015053829A1, the device according to the invention:

is more reliable since it requires less maintenance and/or repair interventions; and is less subject to being stopped and has a smoother operation because, instead of being inside the sliding guide means, the end of the rod (17) is outside the sliding guide means and is articulated to the connecting rod.

Numerous variations and detailed modifications can be made to the present embodiment of the invention, within the reach of a person skilled in the art, but within the scope of the invention as expressed by the appended claims.

The invention claimed is:

1. A supporting and stabilizing device for fixing a load to a carrier and stabilizing the load with respect to the carrier, the supporting and stabilizing device comprising:

a first attachment adapted to be secured to the carrier;

a second attachment adapted to be secured to the load;

a first articulation connected to said first attachment;

a second articulation connected to said second attachment; and at least one stabilizer disposed between the first articulation and the second articulation, wherein said at least one stabilizer comprises;

at least one arm having a longitudinal axis and a pair of ends that are rotatably connected to said first articulation and to said second articulation;

a fixed back piece integral with said at least one arm, said fixed back piece having a passageway;

a sliding guide having a tubular shape, said sliding guide being connected to said at least one arm;

a rod having an axis, said rod being connected to one of said first articulation and said second articulation by a connecting rod, said rod crossing the passageway of said fixed back piece and slidingly inserted in said sliding guide; and an elastic member having a first end cooperative with said sliding guide and a second end connected to said rod, wherein said sliding guide is configured such that said rod oscillates relative to the longitudinal axis of said at least one arm.

2. The supporting and stabilizing device of claim 1, wherein said sliding guide has a movable connector that movably connects said sliding guide to said at least one arm.

3. The supporting and stabilizing device of claim 1, wherein the movable connector has an elastically deformable member disposed between said sliding guide and said fixed back piece.

4. The supporting and stabilizing device of claim 1, wherein the movable connector has a pivot connecting said sliding guide to said at least one arm.

5. The supporting and stabilizing device of claim 1, wherein said sliding guide is deformable.

6. The supporting and stabilizing device of claim 5, wherein said sliding guide is elastically deformable.

7. The supporting and stabilizing device of claim 6, wherein said sliding guide is formed of a technopolymer or a metallic material.

8. The supporting and stabilizing device of claim 1, wherein the first end and the second end of said elastic member are compressible, wherein said rod has a first end section at the second end of the elastic member and a second end section that is articulated to an end of the connecting rod.

9. The supporting and stabilizing device of claim 1, wherein said elastic member is of a helical shape, said rod internally crossing the helical shape of said elastic member.

10. The supporting and stabilizing device of claim 1, wherein the at least one arm of said stabilizer has a pair of arms in side-by-side relation.

11. The supporting and stabilizing device of claim 1, wherein said sliding guide has a bushing portion on an exterior thereof, the bushing portion having a protruding annular edge engaged with the first end of said elastic member.

12. The supporting and stabilizing device of claim 1, wherein the connecting rod is adjustable lengthwise and has a first portion and a second portion which are slidable and lockable in relation to each other.

13. The supporting and stabilizing device of claim 8, wherein the first end section of said rod is a screw engaged in a first threaded end of said rod.

14. The supporting and stabilizing device of claim 8, wherein the second end section of said rod has a stop adapted to abut said fixed back piece, wherein the stop has a screw engaged in a thread of the second end section of said rod.

15. The supporting and stabilizing device of claim 1, wherein said at least one stabilizer is a first stabilizer in a proximal position adjacent to the load and a second stabilizer in a distal position adjacent to the carrier.

* * * * *